(12) United States Patent
Anderson (10) Patent No.: US 6,177,957 B1
(45) Date of Patent: *Jan. 23, 2001

(54) SYSTEM AND METHOD FOR DYNAMICALLY UPDATING FEATURES IN AN ELECTRONIC IMAGING DEVICE

(75) Inventor: Eric Anderson, San Jose, CA (US)

(73) Assignee: FlashPoint Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/032,385

(22) Filed: Feb. 26, 1998

(51) Int. Cl.[7] ........................................... H04N 5/76
(52) U.S. Cl. ................................ 348/231; 348/332
(58) Field of Search ............................ 348/231, 232, 348/233, 239, 333, 334; 235/492, 475, 441; 711/115; 345/352, 353, 146; 710/102, 103

(56) References Cited

U.S. PATENT DOCUMENTS

| 5,475,441 | | 12/1995 | Parulski et al. | 348/552 |
|---|---|---|---|---|
| 5,477,264 | * | 12/1995 | Sarbadhikari et al. | 348/231 |
| 5,590,306 | * | 12/1996 | Watanabe et al. | 395/442 |
| 5,633,678 | * | 5/1997 | Parulski et al. | 348/232 |
| 5,648,816 | * | 7/1997 | Wakui | 348/233 |
| 5,781,798 | * | 7/1998 | Beatty et al. | 396/830 |
| 5,835,761 | * | 11/1998 | Ishii et al. | 395/653 |
| 5,861,918 | * | 1/1999 | Anderson et al. | 348/233 |
| 5,870,756 | * | 2/1999 | Nakata et al. | 707/200 |
| 5,901,303 | * | 5/1999 | Chew | 235/492 |
| 5,983,297 | * | 11/1999 | Noble et al. | 710/102 |
| 5,999,740 | * | 12/1999 | Rowley | 395/712 |
| 6,015,093 | * | 1/2000 | Barrett et al. | 235/492 |
| 6,035,359 | * | 3/2000 | Enoki | 710/103 |

OTHER PUBLICATIONS

Laboratory Analysis, Popular Photography, Sep. 1993, p. 48.
PCMCIA for PowerBook 500 Series Computers, Apple Computer world–wide–web page, May 2, 1996.

* cited by examiner

Primary Examiner—Wendy Garber
Assistant Examiner—Jacqueline Wilson
(74) Attorney, Agent, or Firm—Sawyer Law Group LLP (57) ABSTRACT

A system and method for dynamically updating software-driven features in an electronic imaging device, including digital cameras, is disclosed. The user of the electronic imaging device may desire various features which are not supported by the baseline application program that is built into the electronic imaging device. In the present invention, the user may select removable memory devices to supplement the baseline application program. The user inserts the removable memory device into an external connector of the electronic imaging device. The computer of the electronic imaging device then automatically scans the removable memory device for executable software items, and displays these items in various menus as appropriate. The user may then select these items for execution without having to reboot the computer of the electronic imaging device. When the user is finished using the features on the removable memory device, he may remove it with no subsequent operator intervention required. The computer of the electronic imaging device then automatically removes from the appropriate menus the executable software items that had been added.

32 Claims, 12 Drawing Sheets

SYSTEM AND METHOD FOR DYNAMICALLY UPDATING FEATURES IN AN ELECTRONIC IMAGING DEVICE

BACKGROUND OF THE INVENTION

1. Field of the Invention

This invention relates generally to electronic imaging devices and more particularly to a system and method of dynamically updating software-driven features in an electronic imaging device.

2. Description of the Background Art

Modern digital cameras are capable of providing not only image capture capabilities but also image storage and manipulation capabilities. Powerful software tools which once were executed on an external computer workstation are now capable of execution within the digital camera itself. However, the miniaturization of digital cameras presents severe data memory shortage problems. Digital cameras are typically smaller than laptop computers and personal digital assistants, and yet image manipulation is one of the most memory intensive forms of digital processing. With current memory technology it is not possible to have enough memory in a typical digital camera to simultaneously store all of a typical user's desired software. Moreover, new and better software may be developed after the purchase of a particular digital camera by a consumer. Updating the application software may be difficult after the sale of the digital camera to the consumer.

One method for dealing with this problem is to use removable memory devices, such as floppy disks or non-volatile semiconductor memory cards. A user may select a set of these which may satisfy his or her needs on a given occasion, and insert them into the digital camera when the software feature on a given removable device is required. An example of this is given in U.S. Pat. No. 5,477,264, issued to Sarbadhikari, et al. Sarbadhikari discusses using a removable memory card to import new application programs and algorithms. It is important to recognize that Sarbadhikari teaches the loading of application programs into that RAM which already exists in the digital camera. This requires not only rebooting the system but also that sufficient RAM exists to accommodate the new software.

It is well known in the art that a floppy disk may be inserted into a computer while the computer is running, and that the computer's operating system will recognize the files on the floppy disk. A more recent development is the "hot-mount" circuit card, such as those manufactured to specifications promulgated by the Personal Computer Memory Card International Association (PCMCIA). Here hot-mount refers to a property where the card may safely be inserted into a bus connector on a powered-on and operating computer. The hot-mount circuit card may also be recognized by the computer's operating system.

However there are currently limitations to what may be done with removable memory devices. Data may be entered via a removable memory device, and the existing applications may operate on this data. Application programs may be loaded from the removable memory device, and these may be executed without rebooting the computer. But changing the version of the application program or adding features via modularized code to the application program requires reinitializing the application program and the operating system through the process of rebooting. It is well known in the present art that to display new software functions of an application program in a graphic user interface menu or to run a newly-updated software program requires rebooting the operating system.

The need for rebooting after each addition of modular code to an existing application program undermines the utility of using removable memory devices in a digital camera. Each time a removable memory device is mounted and the new software modules prepared for use, the user must save all of his or her work in progress and the application program settings, and then wait during the period of time in which the computer reboots. What would be of greater utility to the user is a system wherein the applications may use the hot-mount devices to extend the functionality of the current application software without the constant need to reboot.

Therefore, for all of the foregoing reasons, an improved system and method are needed for dynamically updating software-driven features in an electronic imaging device.

SUMMARY OF THE INVENTION

In accordance with the present invention, a system and method are disclosed for dynamically updating software-driven features in an electronic imaging device. The user of the electronic imaging device may desire various features which are not supported by the baseline application program that is built into the electronic imaging device. In the present invention, the user may select removable memory devices to supplement the baseline application program. The user then inserts the removable memory device into an external connector of the electronic imaging device. The computer of the electronic imaging device then automatically scans the removable memory device for executable software items, and displays these items in differing menus as appropriate. The user may then select these items for execution without having to reboot the computer of the electronic imaging device.

In order to accomplish this functionality, the computer of the electronic imaging device keeps the parameters of the user-selectable functions in a dynamically-updateable data structure. These parameters include the menu position information and the entry points for the executable code. Certain utilities acting in cooperation will update the data structure when the insertion of a removable memory device is detected. Other utilities which control the display of menus and execution of code will then have a standard data structure to interrogate in order to determine the current software functions supported, the menus in which they should appear, and the location of their entry points.

When the user is finished using the features contained in the removable memory device, he may remove it with no subsequent operator intervention required. The computer of the electronic imaging device then automatically removes from the appropriate menus the executable software items which had been added from the removable memory device.

The present invention also supports the use of multiple removable memory devices in a given electronic imaging device. In another embodiment of the present invention, the computer tracks changes in executable software functions from more than one removable memory device. This tracking is most important at the point of removal of some but not all of the removable memory devices, as upon removal the removable memory devices are no longer present for interrogation.

The present invention thus allows improved performance and ease of use in electronic imaging devices when used with removable memory devices.

DETAILED DESCRIPTION OF THE PREFERRED EMBODIMENT

The present invention relates to an improvement in electronic imaging devices, including digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention includes a system and method for dynamically updating software-driven features in an electronic imaging device. The user of the electronic imaging device may desire various features which are not supported by the baseline application program that is built into the electronic imaging device. In the present invention, the user may select removable memory devices to supplement the baseline application program. The user then inserts the removable memory device into an external connector of the electronic imaging device. The computer of the electronic imaging device then automatically scans the removable memory device for executable software items, and displays these items in various menus as appropriate. The user may then select these items for execution without having to reboot the computer of the electronic imaging device. When the user is finished using the features on the removable memory device, he may remove it with no subsequent operator intervention required. The computer of the electronic imaging device then automatically removes from the appropriate menus the executable software items which had previously been added from the removable memory device. The present invention also supports the use of multiple removable memory devices in a given electronic imaging device.

Figure 1:
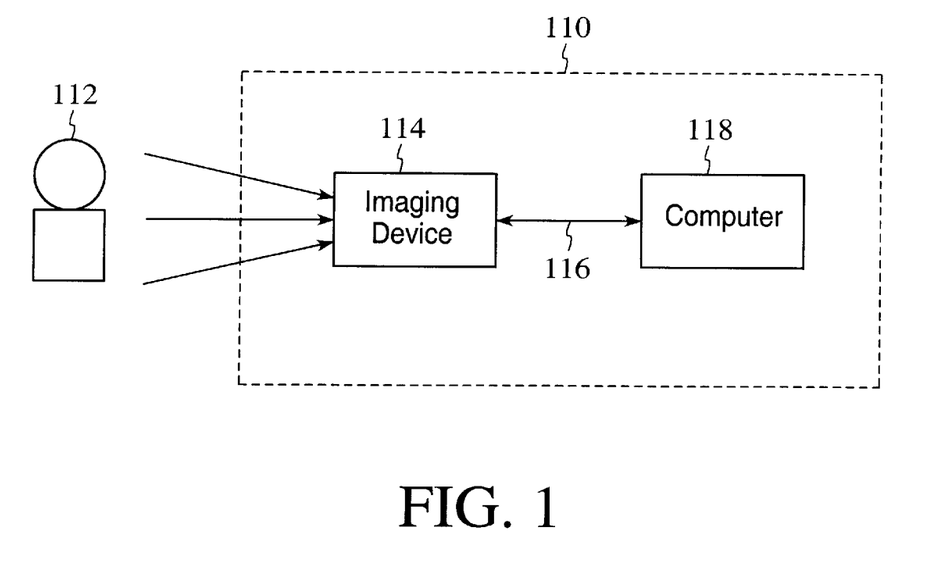
FIG. 1 is a block diagram of a digital camera, according to the present invention.

Referring now to FIG. 1, a block diagram of a digital camera 110 for use in accordance with the present invention is shown. Camera 110 preferably includes an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
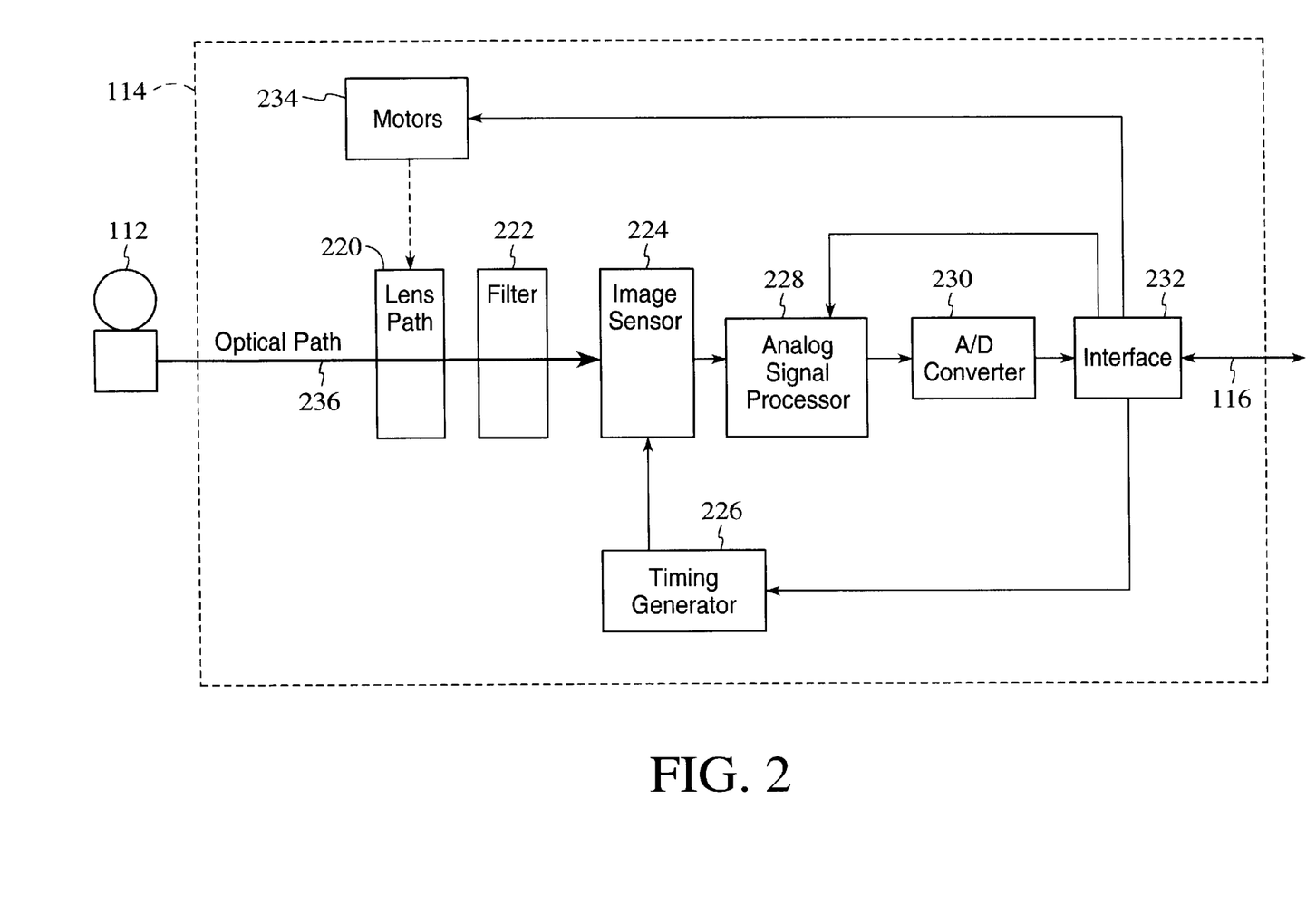
FIG. 2 is a block diagram of one embodiment for the imaging device of FIG. 1.

Referring now to FIG. 2, a block diagram of one embodiment of imaging device 114 is shown. Imaging device 114 typically includes a lens 220 having an iris, a filter 222, an image sensor 224, a timing generator 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
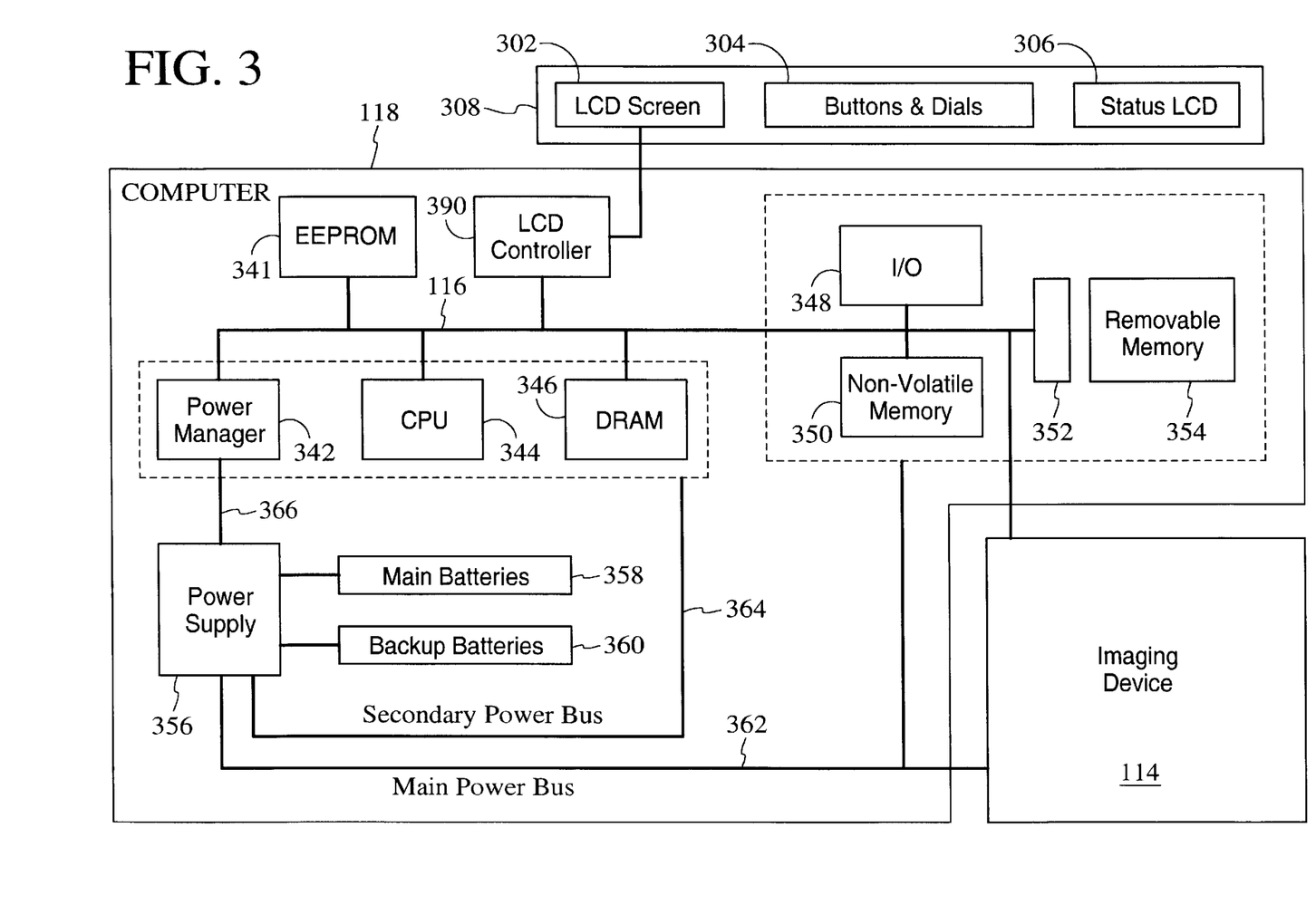
FIG. 3 is a block diagram of one embodiment for the computer of FIG. 1.

Referring now to FIG. 3, a block diagram of one embodiment for computer 118 is shown. System bus 116 provides connection paths between imaging device 114, electrically-erasable programmable read-only memory (EEPROM) 341, an optional power manager 342, central processing unit (CPU) 344, dynamic random-access memory (DRAM) 346, input/output interface (I/O) 348, non-volatile memory 350, and one or more buffers/connectors 352. One or more removable memory 354 connects to system bus 116 via buffers/connectors 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. Liquid Crystal Display (LCD) controller 390 accesses DRAM 346 and transfers processed image data to LCD screen 302 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 304, and an optional status LCD 306, which, in addition to LCD screen 302, are the hardware elements of the camera's user interface 308.

Non-volatile memory 350, which may typically comprise a conventional read-only memory or flash memory, stores a set of computer-readable program instructions to control the operation of camera 110.

Removable memory 354 serves as an additional image data storage area or an additional program code storage area, and is preferably a non-volatile device, readily removable and replaceable by a camera 110 user via buffers/connectors 352. Thus, a user who possesses several removable memories 354 may replace a full removable memory 354 with an empty removable memory 354 to effectively expand the picture-taking capacity or software capabilities of camera 110. In the preferred embodiment of the present invention, removable memory 354 is typically implemented using an electronically-erasable memory card organized with a disk file system structure, called a flash disk. An example of such a flash disk is one made in conformance with the various standards promulgated by the Personal Computer Memory Card International Association (PCMCIA).

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
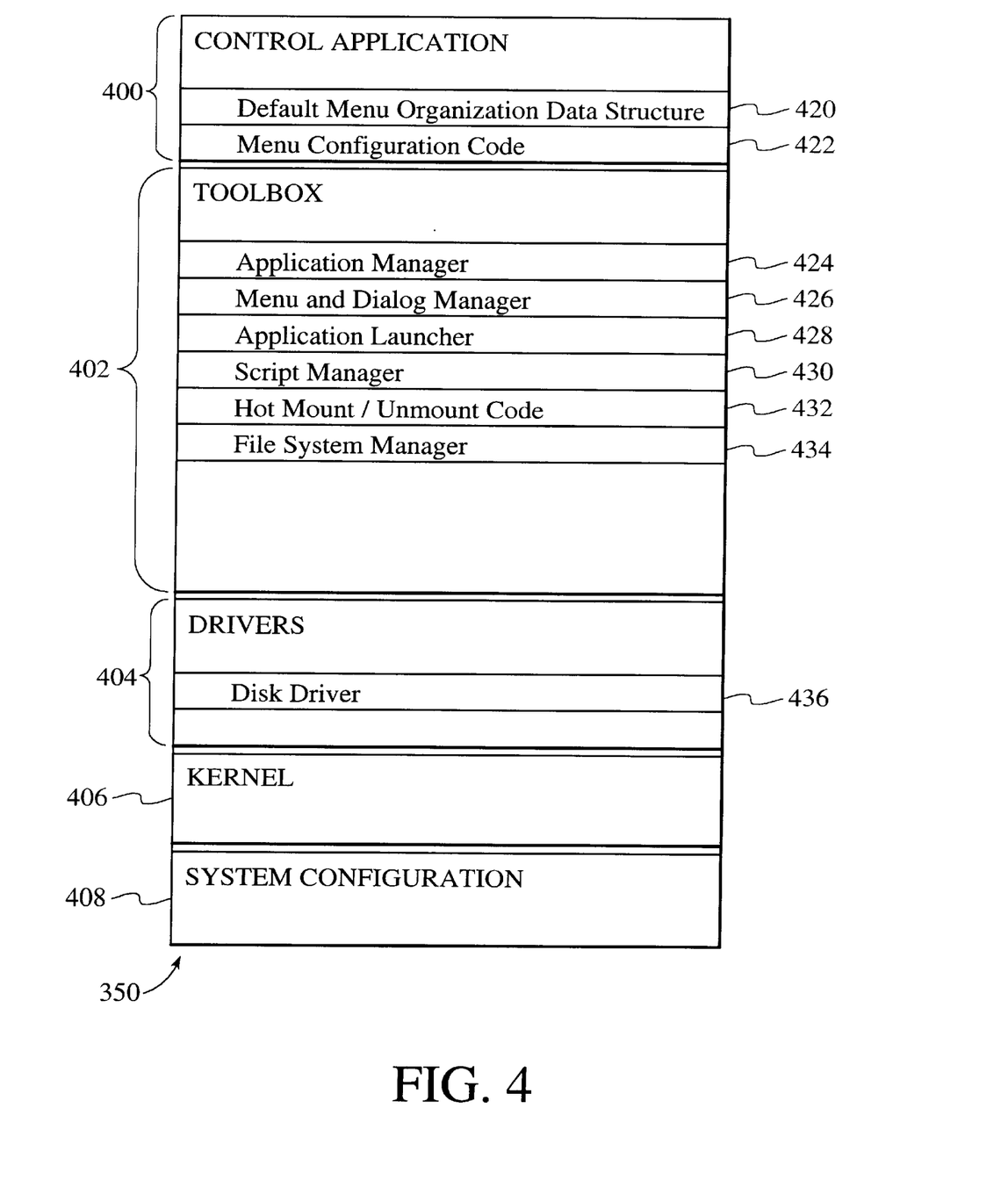
FIG. 4 is a memory map of one embodiment of the non-volatile memory of FIG. 3.

Referring now to FIG. 4, a diagram illustrating the software stored in non-volatile memory 350 is shown. In the FIG. 4 embodiment, non-volatile memory 350 includes control application 400, toolbox 402, drivers 404, kernel 406 and system configuration 408.

Control application 400 includes program instructions for controlling and coordinating the various functions of camera 110. Important among these in the present invention are the default menu organization data structure 420 and the menu configuration code 422. A menu organization data structure is a data structure for organizing data that shows in which menus each user-selectable software function is displayed (defined as menu position information), and that shows the location of the corresponding software code. In the preferred embodiment, removable memory 354 has a disk file system structure, and therefore the location of the code is given by a file reference. In alternate embodiments, the removable memory 354 may be a flat memory, and in that case the location of the code may be given by a starting address (defined as a code entry point). The location of software functions permanently loaded in the camera 110 may also be given by a code entry point. The default menu organization data structure 420 contains the information relevant to those functions of the control application 400 which are present at initial power-on of camera 110. The default menu organization data structure 420 is initially loaded from non-volatile memory 350 into dynamic random-access memory (DRAM) 346 for use at that location. Alternately, the default menu organization data structure 420 may be used directly from non-volatile memory 350 until it is necessary to change it. At that point it is loaded into DRAM 346. The DRAM copy of the default menu organization data structure 420 becomes the dynamic menu organization data structure 540 (discussed in detail in connection with FIG. 5 below), and varies from the default menu organization data structure 420 as new functions are added to the camera. The default menu organization data structure 420 is used at camera power-on and also whenever a removable memory device is removed from a single removable memory device camera. The menu configuration code 422 is the program responsible for updating the dynamic menu organization data structure 540 and for restoring the default menu organization data structure 420 when appropriate.

Toolbox 402 contains selected function modules including application manager 424, menu and dialog manager 426, application launcher 428, script manager 430, hot mount/unmount code 432, and file system manager 434. The application manager 424 is responsible for running those application programs which are capable of running concurrently with the baseline control application 400. Such application programs are called concurrent application programs. Menu and dialog manager 426 includes software routines which coordinate functions related to the user interface 308, including displaying information on LCD screen 302. Application launcher 428 reboots the computer system when starting those application programs that cannot run concurrently with baseline control application 400. Such application programs are referred to as alternate application programs. Script manager 430 is responsible for executing scripted code modules upon request by control application 400. Hot mount/unmount code 432 makes a summary of the additional functions found on the removable memory device 354, the disk file list, and signals the control application 400 upon completion. File system manager 434 handles the disk operating system file structure on the removable memory 354.

Drivers 404 control various hardware devices within camera 110 (for example, motors 234). Important among the set of drivers in the present invention is disk driver 436 which receives and interprets the hardware generated removable memory insertion/removal signal from buffers/connector 352.

Kernel 406 provides basic underlying services for the camera 110 operating system. System configuration 408 performs initial start-up routines for camera 110, including the boot routine and initial system diagnostics.

Figure 5:
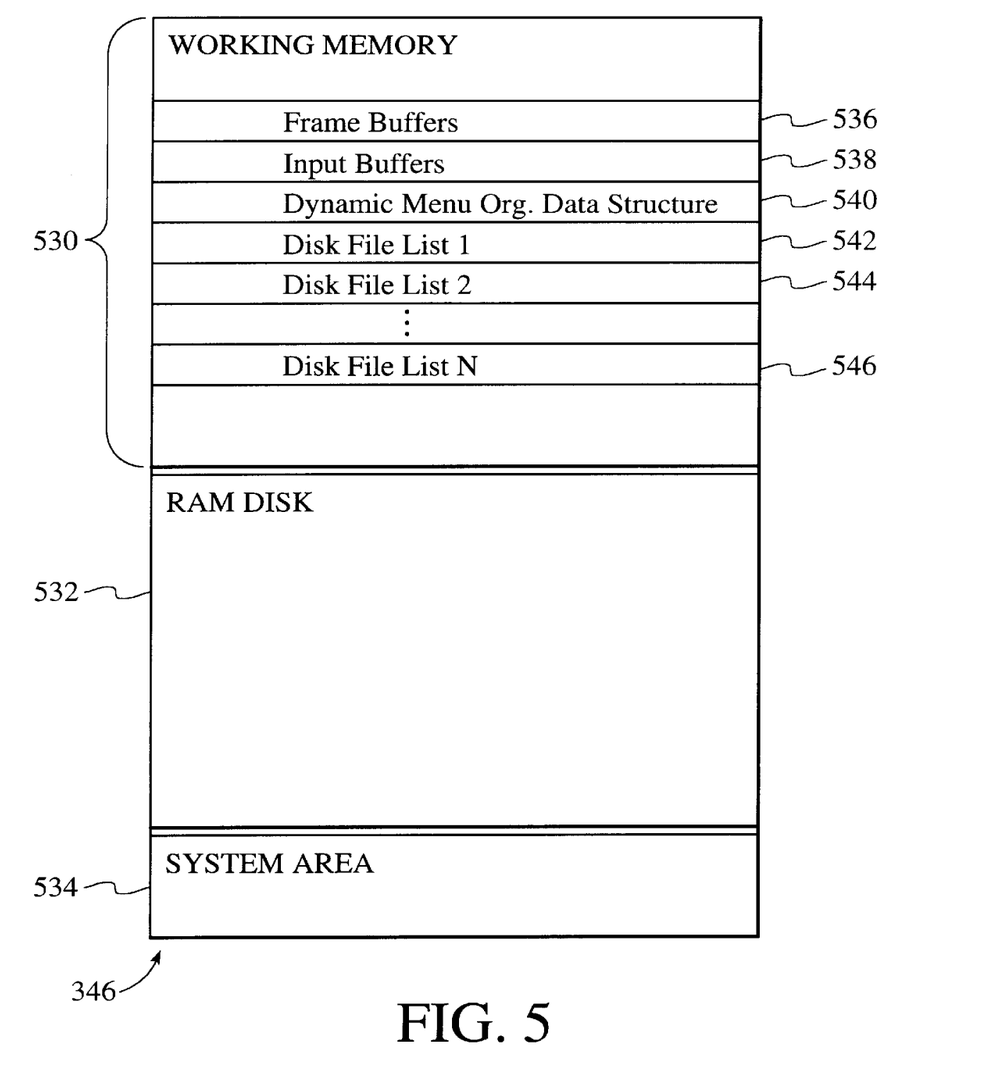
FIG. 5 is a memory map of one embodiment of the dynamic random-access memory of FIG. 3.

Referring now to FIG. 5, a memory map of one embodiment of dynamic random-access-memory (DRAM) 346 is shown. In the FIG. 5 embodiment, DRAM 346 includes working memory 530, RAM disk 532, and system area 534.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 302. Important for the present invention are dynamic menu organization data structure 540 and one or more disk file lists 542, 544, 546. The dynamic menu organization data structure 540 was described above in the discussion of FIG. 4. The disk file lists 542, 544, 546 are created by the hot mount/unmount code 432 from those functional items on removable memory 354. The menu configuration code 422 will use the disk file lists 542, 544, 546 in order to update the dynamic menu organization data structure 540. In the preferred embodiment there will be one disk file list per removable memory 354 inserted, as shown in FIG. 5. In alternate embodiments there may be a single disk file list with each entry tagged with the volume name of the source removable memory.

RAM disk 532 is a memory area used for storing raw and compressed image data and typically is organized in a sectored format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

In the preferred embodiment, a conversion process is performed by a live view generation program, which is stored in non-volatile memory 350 and executed on CPU 344. However, the conversion process can also be implemented using hardware. Referring again to FIG. 3, during the execution of the live view generation program (not shown), CPU 344 takes the raw image data from input buffers 538 in CCD format and performs color space conversion on the data. The conversion process performs gamma correction and converts the raw CCD data into either a Red, Green, Blue (RGB) or a Luminance, Chrominance-red, Chrominance-blue (YCC) color format which is compatible with the LCD screen 302. After the conversion, CPU 344 stores the image data in frame buffers 536. The LCD controller 390 then transfers the processed image data from the frame buffers 536 to the LCD screen 302 (via an optional analog converter) for display.

Figure 6A:
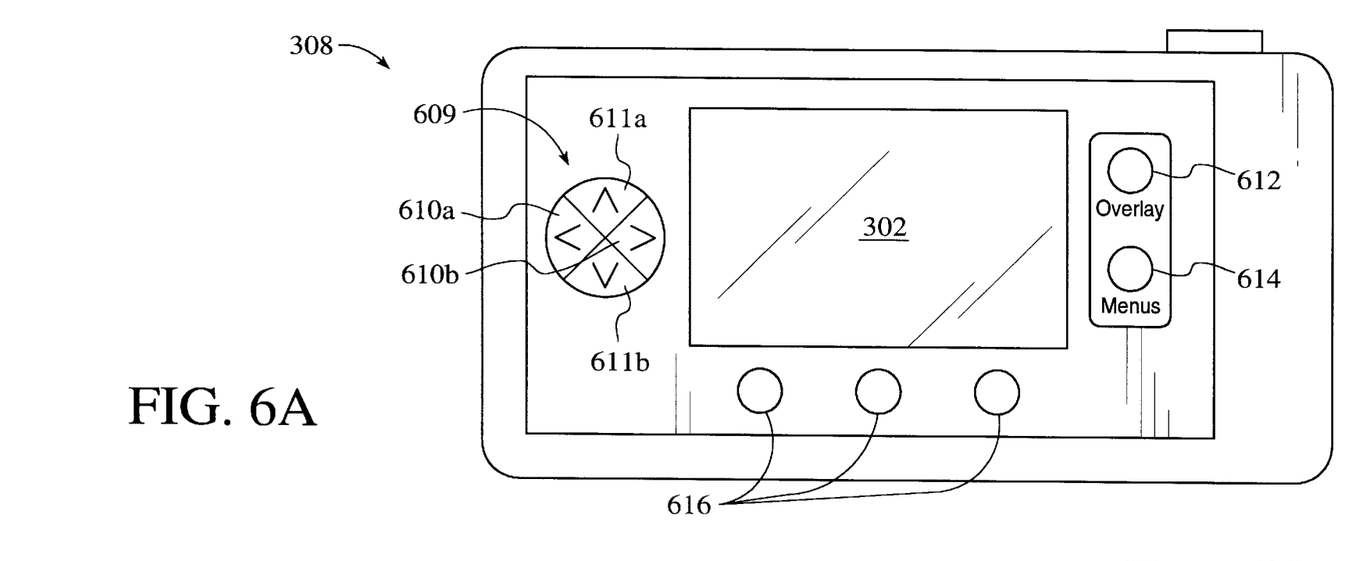
FIG. 6A is an elevation view of one embodiment for the back of the FIG. 1 camera.
Figure 6B:
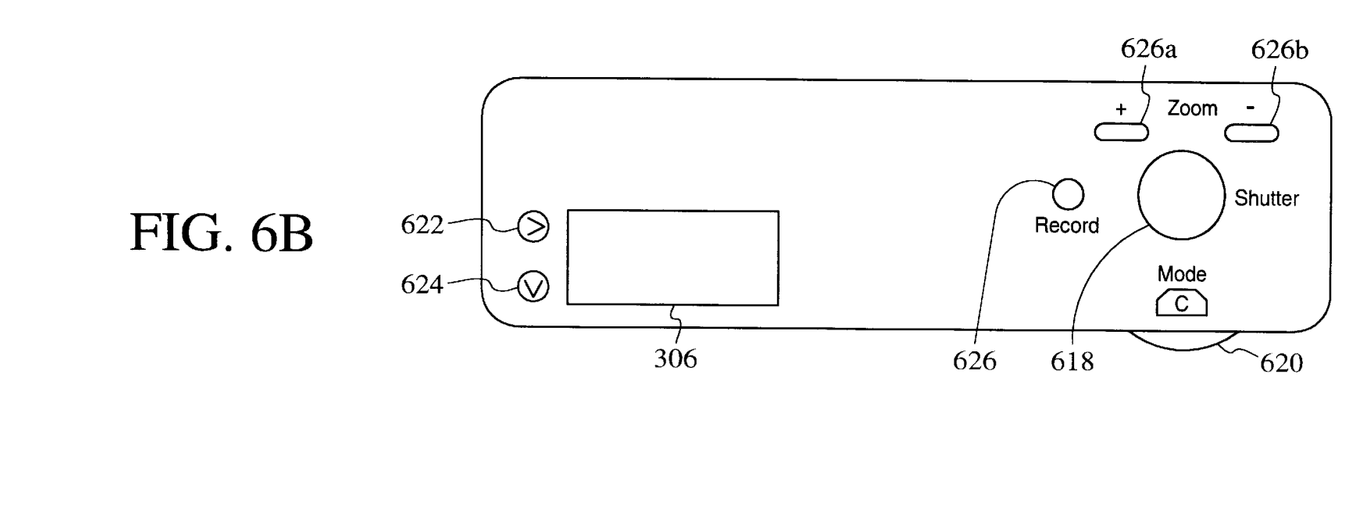
FIG. 6B is a plan view of one embodiment for the top of the FIG. 1 camera.

FIGS. 6A and 6B are diagrams depicting the preferable hardware components of the camera's 110 user interface 308. FIG. 6A is a back view of camera 110 showing the LCD screen 302, a four-way navigation control button 609, an overlay button 612, a menu button 614, and a set of programmable soft keys 616. FIG. 6B is a top view of camera 110 showing a shutter button 618, and a mode dial 620. The camera may optionally include status LCD 306, status LCD scroll and select buttons 622 and 624, a sound record button 626, and zoom-in, zoom-out buttons 626a and 626b.

The user interface 308 includes several different operating modes for supporting various camera functions. Each mode will have a series of menus for the camera user to select desired software-driven functions. The modes relevant to this description are review mode, play mode, and capture (record) mode. In review mode, the camera 110 supports the actions of reviewing camera contents, editing and sorting images, and printing and transferring images. In play mode, the camera 110 allows the user to view screen-sized images in the LCD screen 402 and to hear recorded sound associated with a displayed image. In capture mode, the camera 110 supports the actions of preparing to capture an image, and capturing an image through the use of either the LCD screen 302 or the status LCD 306 as a viewfinder.

The user preferably switches between the review, play, and capture modes using the mode dial 620. When the camera is placed into a particular mode, that mode's default screen appears in the LCD screen 302 in which a set of mode-specific items, such as images, icons, and text, are displayed.

Figure 7:
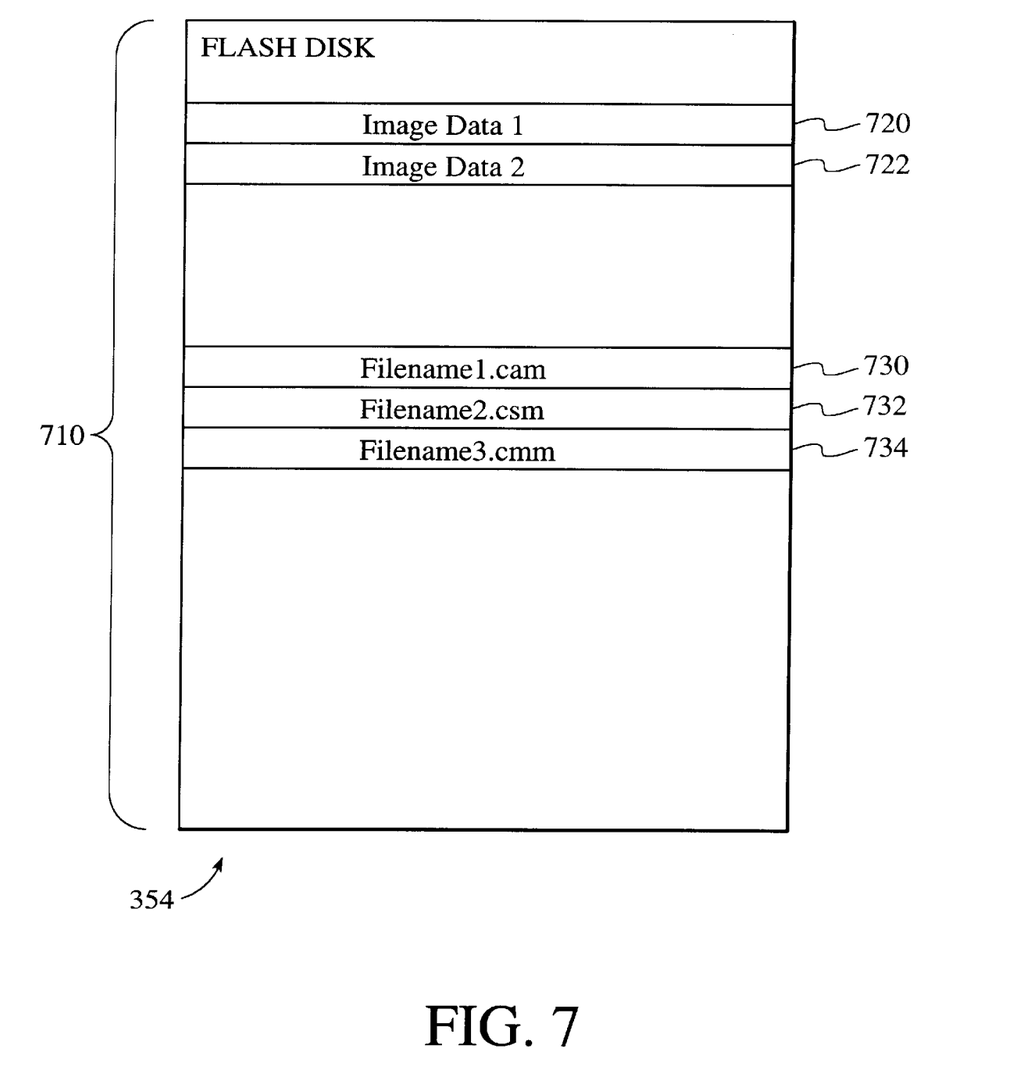
FIG. 7 is a memory map of one embodiment of the removable memory of FIG. 3.

Referring now to FIG. 7, a memory map of a removable memory 354 flash disk 710 is shown. Flash disk 710 is a memory organized in a sectored format similar to that of conventional floppy disks. Flash disk 710 may contain several image data files 720, 722 and several executable files. In the preferred embodiment of the present invention three kinds of executable files are pertinent, and these are stored in a folder named SYSTEM on flash disk 710. These three kinds of executable files may be identified by their unique filename extensions. These are the files with filename extensions cam (camera application module) 730, .csm (camera script module) 732, and .cmm (camera menu module) 734. The files with extensions .cam 730 are application programs, and may be one of two forms, concurrent application programs or alternate application programs, as defined above in the discussion of FIG. 4. Either form of cam 730 files may be dynamically linked into the system. The files with extensions .csm 732 are scripts. These are useful in executing series of functions which frequently recur, or for customizing camera 110 for a specific purpose. The files with extensions .cmm 734 are modularized functions which extend the functionality of the control application. These .cmm files are portions of software executable code that are dynamically linked into the system and have a defined entry point.

The three kinds of executable files may have certain structural features in common. The .csm 732 and .cmm 734 contain three items: the menu set, the menu title, and the menu item name. The menu set is the mode in which the additional function will appear, which as outlined above in the description of FIG. 6 comprises review mode, play mode, and capture mode. The menu title is the specific menu in which the additional function will appear. An example of a menu title is "edit" which is a specific menu in the "review mode". The menu item name is the title of the additional function as it will appear in the specific menu. An example of such a function appearing on the edit menu would be "insert copyright notice".

In the case of the cam 730 files representing concurrent applications, one menu title is already known, as the .cam 730 files may always appear in the "applications" menu. The cam 730 files may additionally contain completely new menu titles. In these cases, a new menu may be added with a new menu title.

The menu information items in each executable file, as described above, are extracted by the hot mount/unmount code 432 and used to create one of the disk file lists 542, 544, 546. The new disk file list is then read by the menu configuration code 422 as it updates the dynamic menu organization data structure 540.

Figure 8:
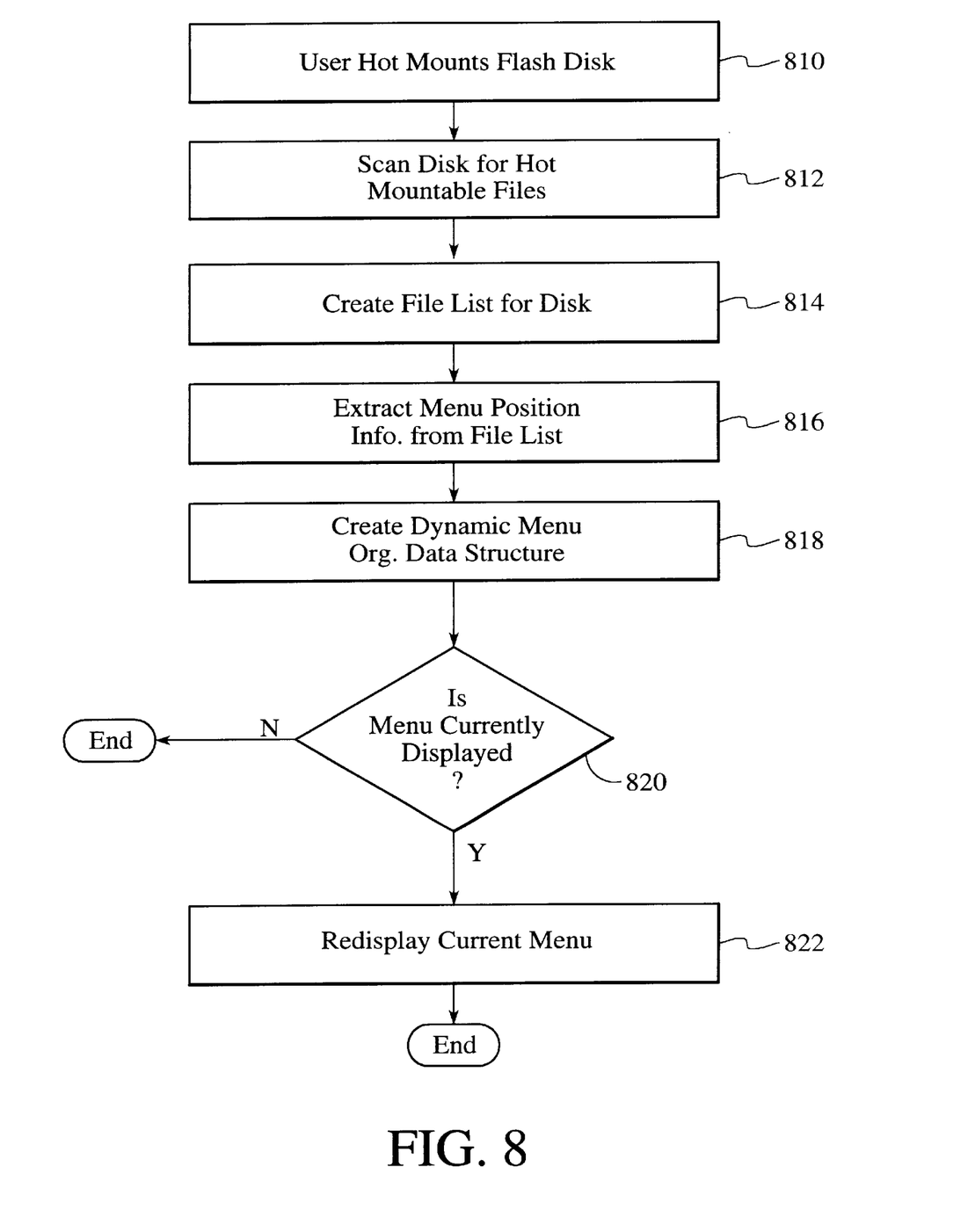
FIG. 8 is a flowchart of process steps for adding software functions, according to the present invention.

Referring now to FIG. 8, a flowchart of process steps for adding software functions is shown in accordance with the preferred embodiment of the present invention. In step 810, the camera user begins the process by physically inserting (hot mounting) a removable memory 354 flash disk 710 into the buffers/connector 352. The buffers/connectors 352 create a hardware generated device present signal which is interpreted by disk driver 436.

Then in step 812, disk driver 436 signals the control application 400, which invokes the hot mount/unmount code 432, which then scans the flash disk 710 for hot-mountable files. After scanning for hot-mountable files, in step 814 the hot mount/unmount code 432 then makes a summary of the additional functions which were found, this summary being a disk file list. The control application 400 then signals the menu configuration code 422.

In step 816, the menu configuration code 422 extracts the list of functions added from the disk file list. It then extracts menu position information and code entry point information, and in step 818 from this information rebuilds the dynamic menu organization data structure 540 to reflect the added functions.

Once the dynamic menu organization data structure 540 is updated, the control application 400 knows which functions are available for selection by the operator. At this point, in step 820, a decision is made. If the menu which contains a given new function is currently displayed on the LCD screen 302, then in step 822 the menu and dialog manager 426 will immediately redisplay the menu to add the new function. If the menu which contains a given new function is not currently displayed on the LCD screen 302, then no present display activity will be initiated. The updated dynamic menu organization data structure 540 will retain the information about the new functions and in which menu they will appear until such menus are next displayed.

In the discussion of FIG. 8 above, no distinction was made between the newly inserted removable memory being the only one (in single card slot models of digital cameras) and it being one of several removable memories (in multiple card slot models of digital cameras). A distinction does exist during the removal process. If there may only be one removable memory in a given digital camera, then a simplified software removal process is possible.

Figure 9:
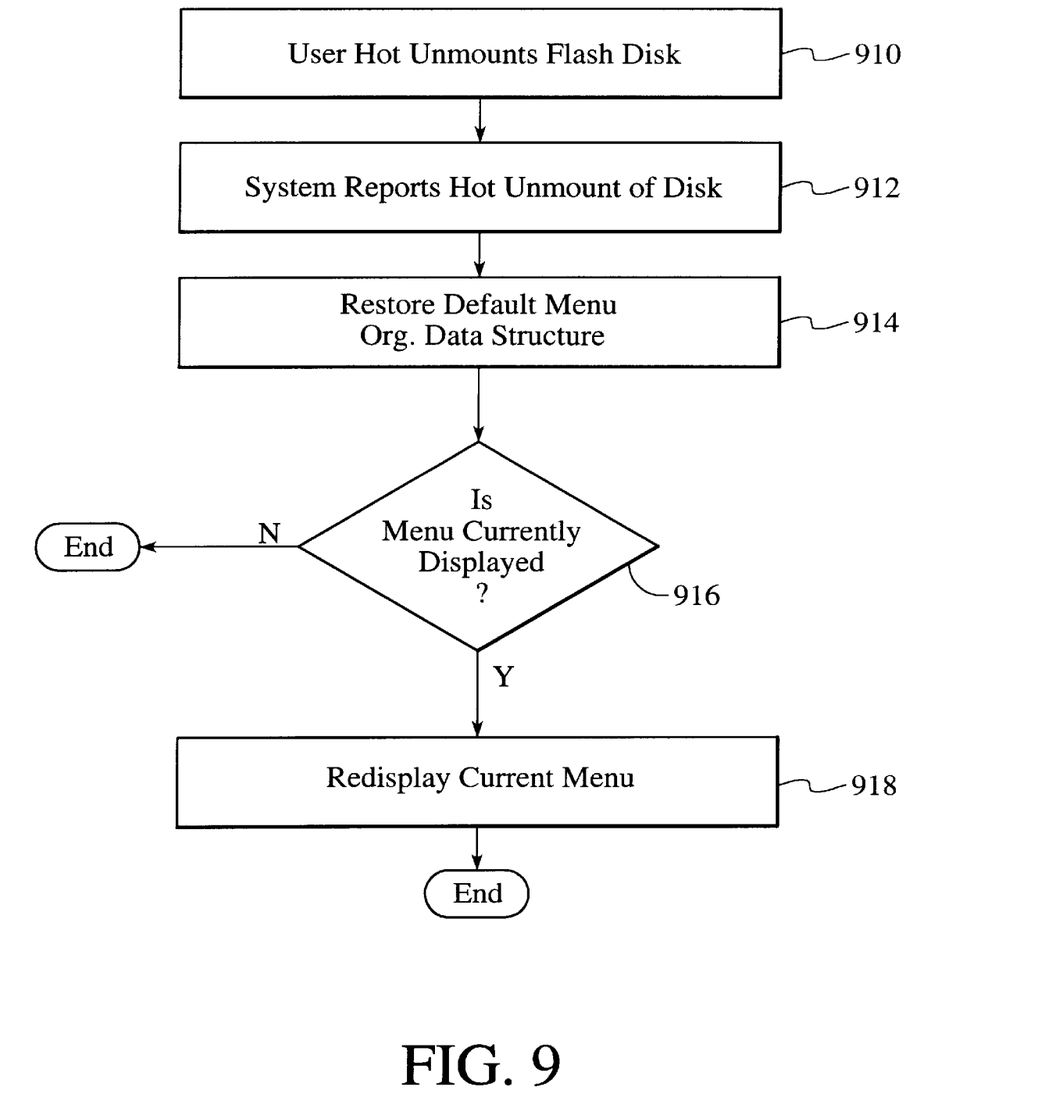
FIG. 9 is a flowchart of process steps for removing software functions in a single removable memory environment, according to the present invention.

Referring now to FIG. 9, a flowchart of process steps for removing software functions in a single removable memory environment is shown. In step 910, the process is initiated by the user of the digital camera 110 physically removing the removable memory 354 flash disk 710 from the camera 110. The buffers/connectors 352 generate a hardware status signal indicating the removal. Using this signal, in step 912 the disk driver 436 signals the control application 400, which invokes the hot mount/unmount code 432 and then the menu configuration code 422 to process the removal. Since there is only one removable memory in this case, all of the changes in the dynamic menu organization data structure 540 were in response to the single previously inserted removable memory 354 flash disk 710. Thus in step 914, rather than calculate the changes required to remove individual function menu items, it is simpler to restore the default menu organization data structure 420 into the dynamic menu organization data structure 540. Once the default menu organization data structure 420 is restored, in step 916 the control application 400 checks to see if the menu and dialog manager 426 is displaying a menu on the LCD screen 302. If so, then the control application 400 invokes the menu and dialog manager 426 to re-display the menu from the dynamic menu organization data structure 540. If not, then the updated dynamic menu organization data structure 540 will retain the information about the changed functions until menus are again displayed.

Figure 10:
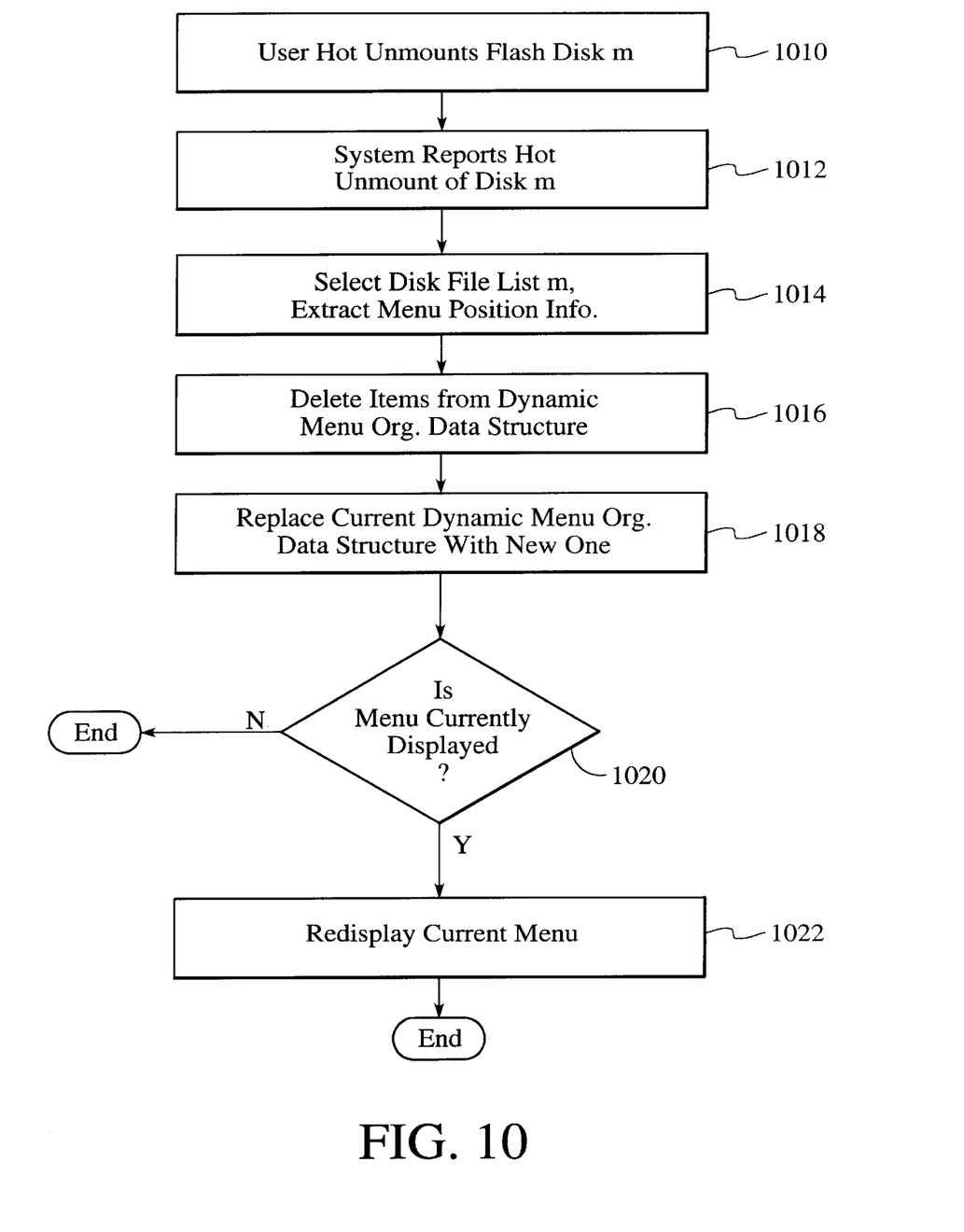
FIG. 10 is a flowchart of process steps for removing software functions in a multiple removable memory environment, according to the present invention.

Referring now to FIG. 10, a flowchart of process steps for removing software functions in a multiple removable memory environment is shown. In step 1010, the process is again initiated by the user of the digital camera 110, in this case physically removing the number m removable memory 354 flash disk 710 from the camera 110. The buffers/connectors 352 generate a hardware status signal showing the removal of the number m unit. Using this signal, in step 1012 the disk driver 436 signals the control application 400, which then invokes the hot mount/unmount code 432 and in turn the menu configuration code 422 to process the removal. Then in step 1014, the menu configuration code 422 then examines disk file list m and extracts the list of functions added from the number m removable memory 354 flash disk 710. The menu configuration code 422 then makes a temporary copy of the dynamic menu organization data structure 540. In step 1016, functions which had been added by the number m removable memory 354 flash disk 710 are deleted from this temporary copy. When all of the deletions are finished, in step 1018 the menu configuration code 422 replaces the dynamic menu organization data structure 540 with the temporary copy. At this point the disk file list m and the temporary copy of the dynamic menu organization data structure 540 are discarded. In step 1020, the process again ends with the control application 400 checking to see if a menu is displaying on the LCD screen 302. If so, then in step 1022 the control application 400 invokes the menu and dialog manager 426 to re-read the dynamic menu organization data structure 540 and redisplay the menu. If not, then the updated dynamic menu organization data structure 540 will retain the information about the changed functions until menus are again displayed.

Figure 11:
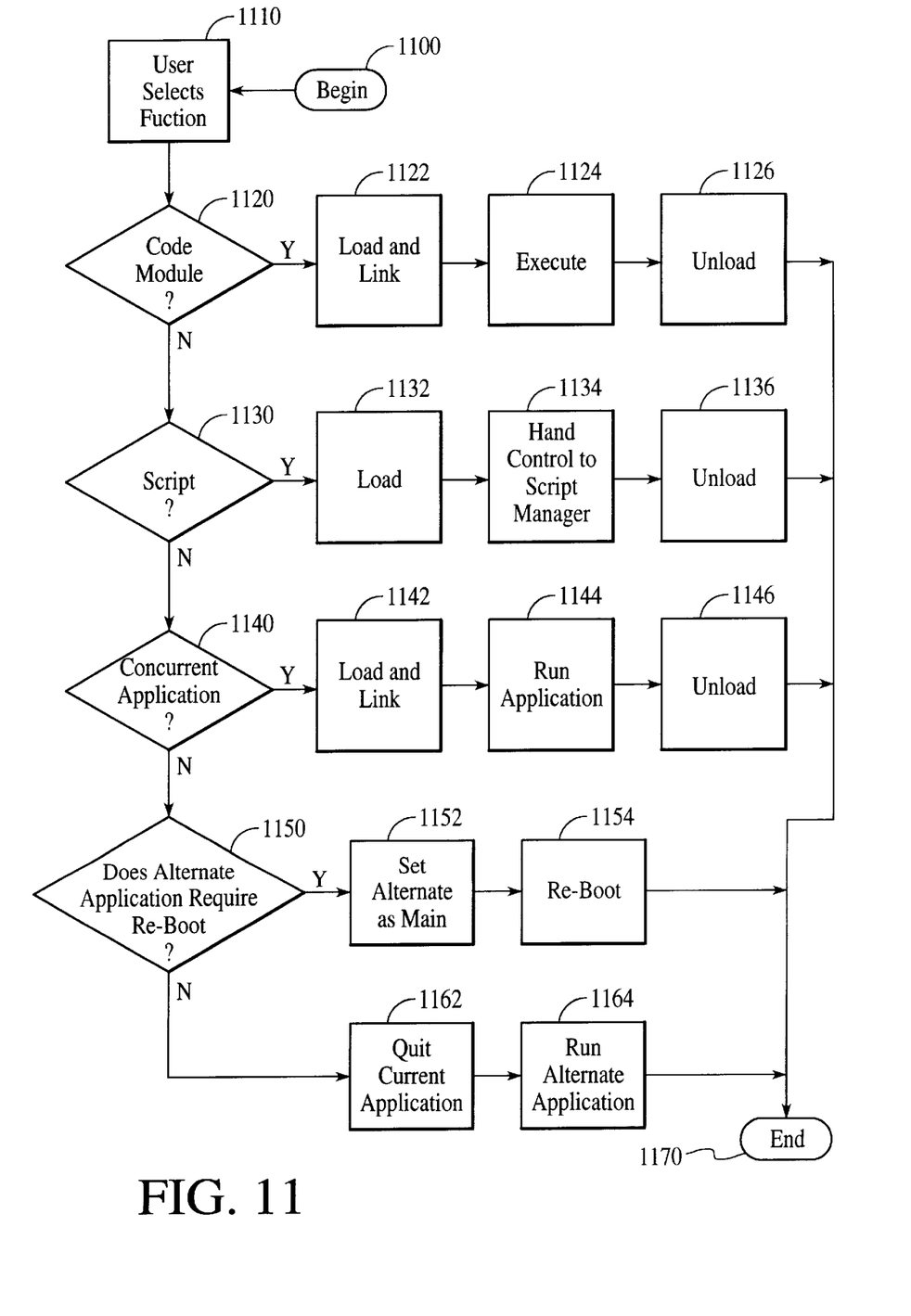
FIG. 11 is a flowchart of process steps for executing software functions under user selection, according to the present invention.

Referring now to FIG. 11, a flowchart of process steps for executing software functions under user selection is shown. Prior to the time of the events depicted in FIG. 11, a removable memory 354 (see FIG. 3) has been hot-mounted, and the dynamic menu organization data structure 540 (see FIG. 5) has been updated as shown in FIG. 8 to reference the additional software functions stored on removable memory 354. The software functions referenced in the dynamic menu organization data structure 540 are thus available for display in menus for user selection. However, the software code for the functions is not loaded from the removable memory 354 into DRAM 346 until the user has selected the desired function. This reduces the amount of DRAM 346 required.

In step 1110, the camera user selects a desired software function from a graphical user interface (GUI) menu. In steps 1120, 1130, 1140, and 1150 a series of decisions determines the type of software function selected. If step 1120 determines that the software function is a code module, in the preferred embodiment of type .cmm 734, then in step 1122 the code module is loaded from the removable memory 354 disk file structure into DRAM 346. After the code module is resident in DRAM 346 it is linked to the application by having the code module's code entry points communicated to the application. Likewise, toolbox 402 entry points are communicated to the code module. Then in step 1124 the code module is executed. After the code module is executed, in step 1126 the DRAM 346 area occupied by the code module is de-allocated for re-use, and the process completes in step 1170.

If step 1130 determines that the software function is a script, in the preferred embodiment of type .csm 732, then in step 1132 the script is loaded into DRAM 346. As a script is source code and not executable object code, in step 1134 the script manager 430 interprets and thereby executes the script. After the script is executed, in step 1136 the DRAM 346 area occupied by the script is de-allocated for re-use, and the process completes in step 1170.

If step 1140 determines that the software function is a concurrent application, in the preferred embodiment of type .cam 730, then in step 1142 the script is loaded into DRAM 346. After the concurrent application is resident in DRAM 346, it is linked to the application by having the concurrent code entry points communicated to the application and the toolbox 402 entry points communicated to the concurrent application. Then in step 1144 the concurrent application is executed. After the concurrent application is executed, in step 116 the DRAM 346 area occupied by the concurrent application is de-allocated for re-use, and the process completes in step 1170.

If step 1150 determines that the software function is an alternate application which requires rebooting the camera, in the preferred embodiment of type .cam 730, then in step 1152 a condition is set to have the alternate application execute upon re-boot. Then in step 1154 the camera is re-booted, and the process completes in step 1170.

Finally, if step 1150 determines that the software function is a alternate application requiring no re-booting of the camera, in the preferred embodiment of type .cam 730, then in step 1162 the current application is exited and in step 1164 the alternate application is executed.

Figure 12A:
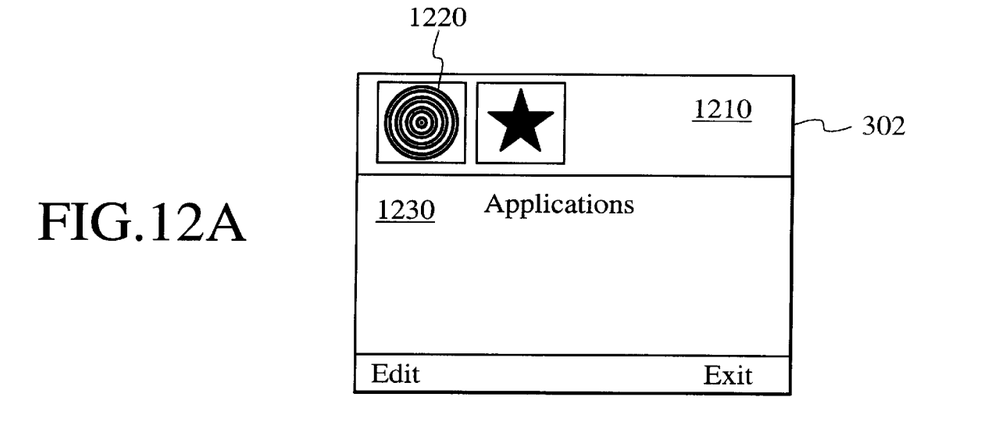
FIG. 12A is a view of the graphical user interface prior to inserting the removable memory.

Referring now to FIG. 12A, a view of the graphical user interface (GUI) prior to inserting removable memory 354 is shown. In the preferred embodiment, the user views the GUI presented on LCD screen 302 (see FIG. 3). LCD screen 302 may contain an icon space 1210 and a menu selection space 1230. An icon 1220 is shown in icon space 1210. The menu selection space 1230 is shown with empty space available for future menu entries. Note that in the preferred embodiment the icon and menu mode are not shown if there are no menu items.

Figure 12B:
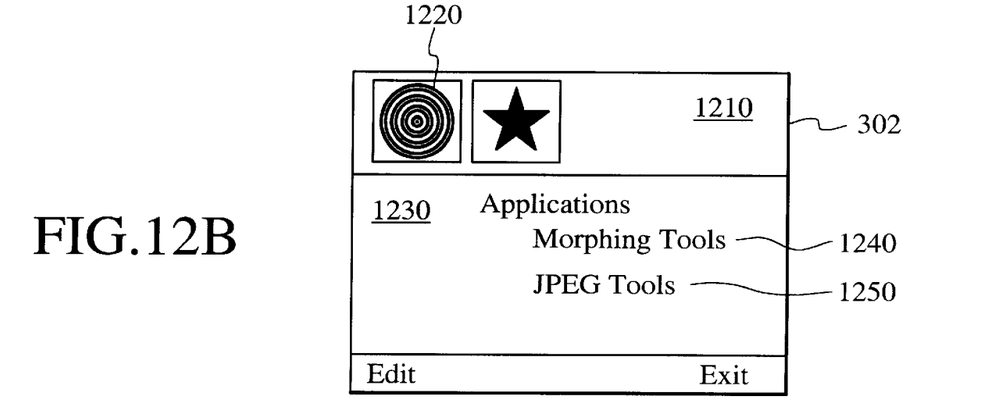
FIG. 12B is a view of the graphical user interface after inserting the removable memory.

Referring now to FIG. 12B, a view of the GUI after inserting the removable memory 354 is shown. New application 1 (1240) called "morphing tools" and new application 2 (1250) called "JPEG tools" are shown in menu selection space 1230 as examples of applications which could be contained on removable memory 354. Because new application 1 (1240) and new application 2 (1250) are shown on the menu selection space 1230, they are available for camera user selection. In the example of FIGS. 12A and 12B the new software functions could be displayed in an existing menu. It should be noticed that new software functions carried on removable memory 354 may create completely new menus, not merely new entries in existing menus. In these cases a default icon may be used, or an icon may be created from an attachment to the file.

Figure 13:
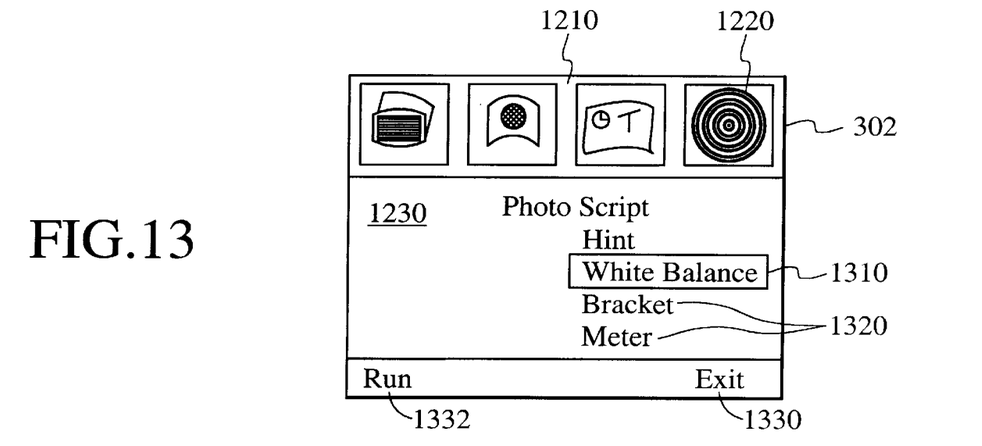
FIG. 13 is a view of the graphical user interface showing the selection of desired software functions.

Referring now to FIG. 13, a view of the GUI showing the selection of desired software functions is shown, according to the preferred embodiment of the present invention. The subfeature menu for the software feature "photo script" is shown for the purpose of illustration. In menu selection space 1230 are shown a highlighted title 1310 and several non-highlighted titles 1320. In the preferred embodiment, the user may move the highlighting over the menu entry shown by adjusting four-way navigation control button 609 (see FIG. 6). Once the desired menu entry is highlighted, the user may run the corresponding software subfeature by pressing the programmable soft key 616 adjacent to the soft function key indicator 1332 "run" displayed in the soft function key indicator bar 1330.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for dynamically updating software functions in an electronic imaging device supporting a removable memory device, the removable memory device containing at least one new software function and menu information relating to the at least one new software function, the system comprising:

a dynamic menu organization structure for displaying the software functions currently supported by the electronic imaging device in a menu; and a menu configuration code for dynamically updating the dynamic menu organization data structure using the menu information in response to detecting the at least one new software function on the removable memory device while the electronic imaging device is operating, wherein the at least one new software function may be displayed in the menu for selection, thereby allowing the software functions displayed in the menu to be updated without rebooting the electronic imaging device after insertion of the removable memory device containing the at least one new software function.

2. The system of claim 1 wherein the dynamic menu organization data structure includes menu position information storage and code location storage.

3. The system of claim 2 further comprising a hot mount/unmount code for supplying function information derived from the removable memory device to the menu configuration code.

4. The system of claim 3 further comprising a disk driver for signaling the hot mount/unmount code when the removable memory device is inserted or removed in the electronic imaging device.

5. The system of claim 3 wherein supplying function information comprises creating a disk file list.

6. The system of claim 3 wherein the function information includes menu position information and code location information.

7. The system of claim 6 wherein the menu position information includes position information in existing menus.

8. The system of claim 6 wherein the menu position information includes position information in new menus established in response to the at least one new software function.

9. The system of claim 2 further comprising a menu and dialog manager for displaying menu items listed in the dynamic menu organization data structure.

10. The system of claim 9 wherein the menu and dialog manager initiates the software functions.

11. The system of claim 10 wherein the dynamic menu organization data structure may be initially loaded with a default menu organization data structure.

12. The system of claim 11 wherein the electronic imaging device is a digital camera.

13. A method for dynamically updating software features in an electronic imaging device supporting removable memory devices, a removable memory device of the removable memory devices containing at least one new software function, the method comprising the steps of:

organizing information concerning software functions into a dynamic menu organization data structure on the electronic imaging device, the dynamic menu organization data structure for displaying the software features currently available on the electronic imaging device in a menu; and updating the dynamic menu organization data structure so that the menu includes the at least one new software function contained on the removable memory device using a menu configuration code while the electronic imaging device is operating;

wherein the software features can be updated in response to a user selecting an item listed in the menu without rebooting the electronic imaging device after insertion of the removable memory device containing the at least one new software function.

14. The method of claim 13 wherein the dynamic menu organization data structure includes menu position information storage and code location information storage.

15. The method of claim 14 further comprising the step of:
supplying function information derived from the removable memory device to the menu configuration code by utilizing a hot mount/unmount code.

16. The method of claim 15 further comprising the step of:
signaling the hot mount/unmount code from a disk driver when the removable memory device is inserted or removed in the electronic imaging device.

17. The method of claim 15 wherein the step of supplying function information comprises creating a disk file list.

18. The method of claim 15 wherein the function information includes menu position information and code location information.

19. The method of claim 18 wherein the menu position information includes position information in existing menus.

20. The method of claim 18 wherein the menu position information includes position information in new menus established in response to the at least one new software function.

21. The method of claim 14 further comprising the step of:
displaying menu items listed in the dynamic menu organization data structure by using a menu and dialog manager.

22. The method of claim 21 wherein the menu and dialog manager initiates the software functions.

23. A computer-readable medium comprising program instructions for dynamically updating software features in an electronic imaging device supporting removable memory devices, a removable memory device of the removable memory devices containing at least one new software function, the program including instructions for:
organizing information concerning software functions in a dynamic menu organization data structure on the electronic imaging device, the dynamic menu organization data structure for displaying the software features currently available on the electronic imaging device in a menu; and
updating the dynamic menu organization data structure so that the menu includes the at least one new software function contained on the removable memory device using a menu configuration code while the electronic imaging device is operating;
wherein the software features can be updated in response to a user selecting an item listed in the menu without rebooting the electronic imaging device after insertion of the removable memory device containing the at least one new software function.

24. A system for dynamically updating software features in an electronic imaging device supporting removable memory devices, a removable memory device of the removable memory devices including at least one new software function and menu information relating to the at least one new software function, the system comprising:
means for organizing information concerning the software functions and for displaying the software functions currently supported by the electronic imaging device in a menu; and
means for dynamically updating the means for organizing information with at least one new software function contained on a removable memory device using the menu information while the electronic imaging device is operating;
wherein the software features displayed in the menu can be updated with the at lest one new software function without rebooting the electronic imaging device after insertion of the removable memory device containing the at least one new software function.

25. The system of claim 1 wherein the electronic imaging device further includes a memory and wherein the system further loads a new software function of the new software functions to the memory of the electronic imaging device only in response to a user request to utilize the new software function.

26. The method of claim 13 wherein the electronic imaging device further includes a memory, wherein at least one of the removable memory devices further includes new software functions, and wherein the method further includes the step of:
loading a new software function of the new software functions to the memory of the electronic imaging device only in response to a user request to utilize the new software function.

27. The computer-readable medium of claim 23 wherein the electronic imaging device further includes a memory, wherein at least one of the removable memory devices further includes new software functions, and wherein the program instructions further include the step of:
loading a new software function of the new software functions to the memory of the electronic imaging device only in response to a user request to utilize the new software function.

28. The system of claim 24 wherein the electronic imaging device further includes a memory, wherein at least one of the removable memory devices further includes new software functions, and wherein the system further includes means for:
loading a new software function of the new software functions to the memory of the electronic imaging device only in response to a user request to utilize the new software function.

29. The system of claim 1 wherein the menu is one of a plurality of menus and wherein a developer of the at least one new software function can select the menu of the plurality of menus in which the at least new software function appears when the menu is updated.

30. The method of claim 13 wherein the menu is one of a plurality of menus and wherein a developer of the at least one new software function can select the menu of the plurality of menus in which the at least new software function appears when the menu is updated.

31. The computer-readable medium of claim 23 wherein the menu is one of a plurality of menus and wherein a developer of the at least one new software function can select the menu of the plurality of menus in which the at least new software function appears when the menu is updated.

32. The system of claim 24 wherein the menu is one of a plurality of menus and wherein a developer of the at least one new software function can select the menu of the plurality of menus in which the at least new software function appears when the menu is updated.

* * * * *